United States Patent [19]

Komuro et al.

[11] Patent Number: 5,126,898
[45] Date of Patent: Jun. 30, 1992

[54] AUTOMATIC CASSETTE CHANGER FOR TAPE PLAYER

[75] Inventors: Mutsumi Komuro; Shogo Sato, both of Saitama, Japan

[73] Assignee: Pioneer Electronic Corporation, Tokyo, Japan

[21] Appl. No.: 567,514

[22] Filed: Aug. 16, 1990

[30] Foreign Application Priority Data

Jan. 29, 1990 [JP] Japan .................................. 2-16248

[51] Int. Cl.$^5$ ............................................. G11B 15/68
[52] U.S. Cl. .................................................... 360/92
[58] Field of Search ......................................... 360/92

[56] References Cited

U.S. PATENT DOCUMENTS

| 4,984,897 | 1/1991 | Baranski | 360/92 |
| 5,006,940 | 4/1991 | Hamachi et al. | 360/92 |
| 5,045,958 | 9/1991 | Leonard et al. | 360/92 |

FOREIGN PATENT DOCUMENTS

62-236170 10/1987 Japan .................................. 360/92

Primary Examiner—John H. Wolff
Attorney, Agent, or Firm—Sughrue, Mion, Zinn, Macpeak & Seas

[57] ABSTRACT

An automatic cassette changer for a tape player. Tape cassettes are inserted into the holding members through the entrances of the holding members. The tape cassettes inserted in a horizontal position are held by holding members which are supported by a supporting member. The holding members are disposed in vertically stacked relation with a clearance therebetween. An extracting mechanism extracts one of the holding members from the supporting member rearwardly into the tape player. An elevating mechanism carries the extracting mechanism to a holding member which contains a desired tape cassette therein. The elevating mechanism loads the desired tape cassette extracted by the extracting mechanism from the holding member into a tape driving mechanism.

7 Claims, 14 Drawing Sheets

AUTOMATIC CASSETTE CHANGER FOR TAPE PLAYER

BACKGROUND OF THE INVENTION

The present invention relates to an improved automatic cassette changer for a tape player in which a plurality of tape cassettes are accommodated in a holding means, each of which is selectively loaded into a tape drive mechanism for recording and reproducing. The selected tape cassette is then returned to its home position, and the next cassette is then loaded into the tape drive mechanism from the holding means.

Conventionally, this type of automatic cassette changer has lo been of the construction in which a plurality of tape cassettes are loaded into a magazine. The magazine is then placed into the tape player and is moved within the player for selecting a desired cassette therefrom.

With such an arrangement, the tape player requires a large space in which the magazine can move. This places limitations on miniaturization of the tape player. To overcome the above-described drawback, Japanese Patent Unexamined Publication No. 1-89066, applied for by the present applicant, discloses an automatic cassette changer for a digital audio cassette tape player and Japanese Patent Unexamined Publication No. 62-500477 discloses an apparatus for recording/reproducing tape cartridges. These apparatuses are of the construction in which a plurality of tape cassettes are directly loaded into the tape player without using a magazine. With such a construction, the tape player requires only a small space for the magazine to move in the tape player, contributing to miniaturization of a tape player.

However, such conventional apparatuses still suffer from drawbacks in that the mechanisms have inherent limitations on further miniaturization of the player, including being too long in depth to be carried on vehicles. The mechanical construction is quite complicated requiring a large number of parts, which not only causes high manufacturing cost but also has a greater chance of problems developing.

SUMMARY OF THE INVENTION

The present invention was made to overcome the aforementioned drawbacks of the automatic cassette changers of conventional tape players. The invention makes it possible to mount a mechanism for exchanging and reloading the cassettes above the tape driving mechanism, thereby permitting a shorter depth of the tape player. An object of the invention is to reduce the complexity of the mechanism and the number of parts to in turn lower the manufacturing costs, thus reducing problems and ensuring the reliability of the tape player.

The present invention provides an automatic cassette changing apparatus for a tape player which comprises holding means for holding a tape cassette so as to load it in a horizontal position, supporting means for supporting the holding means disposed in a vertically spaced relation with a clearance therebetween, extracting means for rearwardly extracting the holding means from the supporting means, and elevator means for adjusting the height of the supporting means by moving the extracting means vertically up and down such that the tape cassette may be loaded into a tape driving mechanism.

BRIEF DESCRIPTION OF THE DRAWINGS

The invention will now be described in detail with reference to the accompanying drawings in which.

DETAILED DESCRIPTION OF THE PREFERRED EMBODIMENTS

An embodiment of an automatic cassette changer for a digital audio tape player according to the invention will now be described with reference to FIGS. 1-19.

Figure 4:
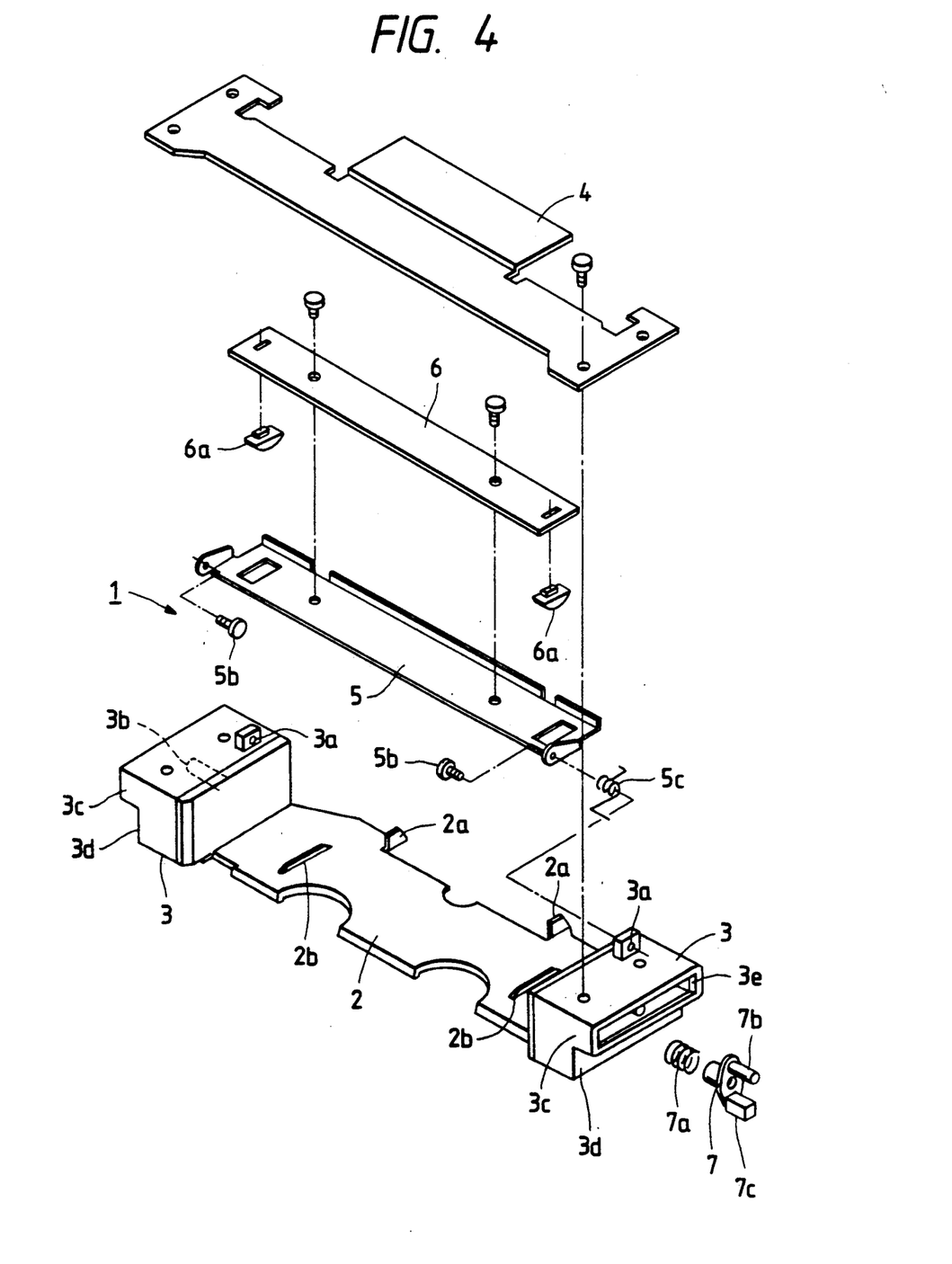
FIG. 4 is an exploded view of the carrier.

FIG. 4 is an exploded view of a carrier 1 for a tape cassette A, which carrier 1 functions as a holding means for holding the tape cassette A. The carrier 1 is constructed of a base 2, two side frames 3, an upper plate 4 and a retaining plate 5 to generally form a rectangular box which is open at the front and rear thereof.

The base 2 is formed with straps 2a and projections 2b thereon. The projections 2b function to unlock a slider $A_1$ of the tape cassette A (see FIG. 5) when the tape cassette A is inserted into the front opening of the carrier 1.

As the tape cassette A is further inserted into the opening, the front end of the slider $A_1$ abuts the straps 2a to be pushed back thereby. The backward motion of the slider $A_1$ unlocks a lid $A_2$ of the tape cassette A while also causing the reel hole of the tape cassette A to be exposed.

Each of the side frames 3 is formed with a supporting hole 3a therein into which a pin 5b is inserted to pivotally support the retaining plate 5 through a hole 5a. The retaining plate 5 is urged downwardly at its tip end by a spring 5c mounted on the pin 5b.

A leaf spring 6, to which a retaining block 6a is secured, is riveted to the retaining plate 5. Thus, when the tape cassette A is not loaded into the carrier 1, the retaining plate 5 is urged by the spring 5c such that the plate 5 is in a vertical position.

Figure 5:
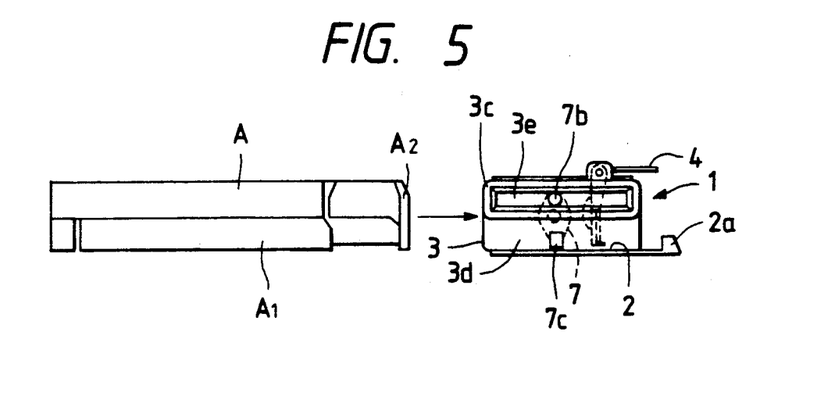
FIGS. 5 and 6 are side views when a tape cassette is loaded into the carrier.
Figure 6:
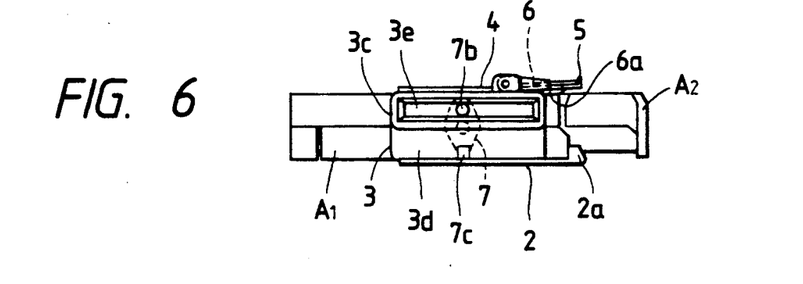

When the tape cassette A in FIG. 5 is loaded into the carrier 1 as shown in FIG. 6, the retaining plate 5 is pushed up against the biasing force of spring 5c while, at the same time, the retaining block 6a depresses the tape cassette A with the aid of the leaf spring 6 to ensure the slide motion of the slider A₁, thereby allowing the carrier 1 to hold the tape cassette A.

Side frames 3 are each formed with an upper projection 3c and a lower step 3d thereon.

Each of the side frames 3 is provided with a guide pin 3b projecting therefrom to engage a lock pin 7 with a spring 7a mounted between the pin 7 and pin 3b such that the lock pin 7 is urged by the spring 7a outwardly. An upper pin 7b of the lock pin 7 projects into a recessed space 3e formed in the upper projection 3c, while a lower pin 7c projects from the lower step 3d.

Figure 2:
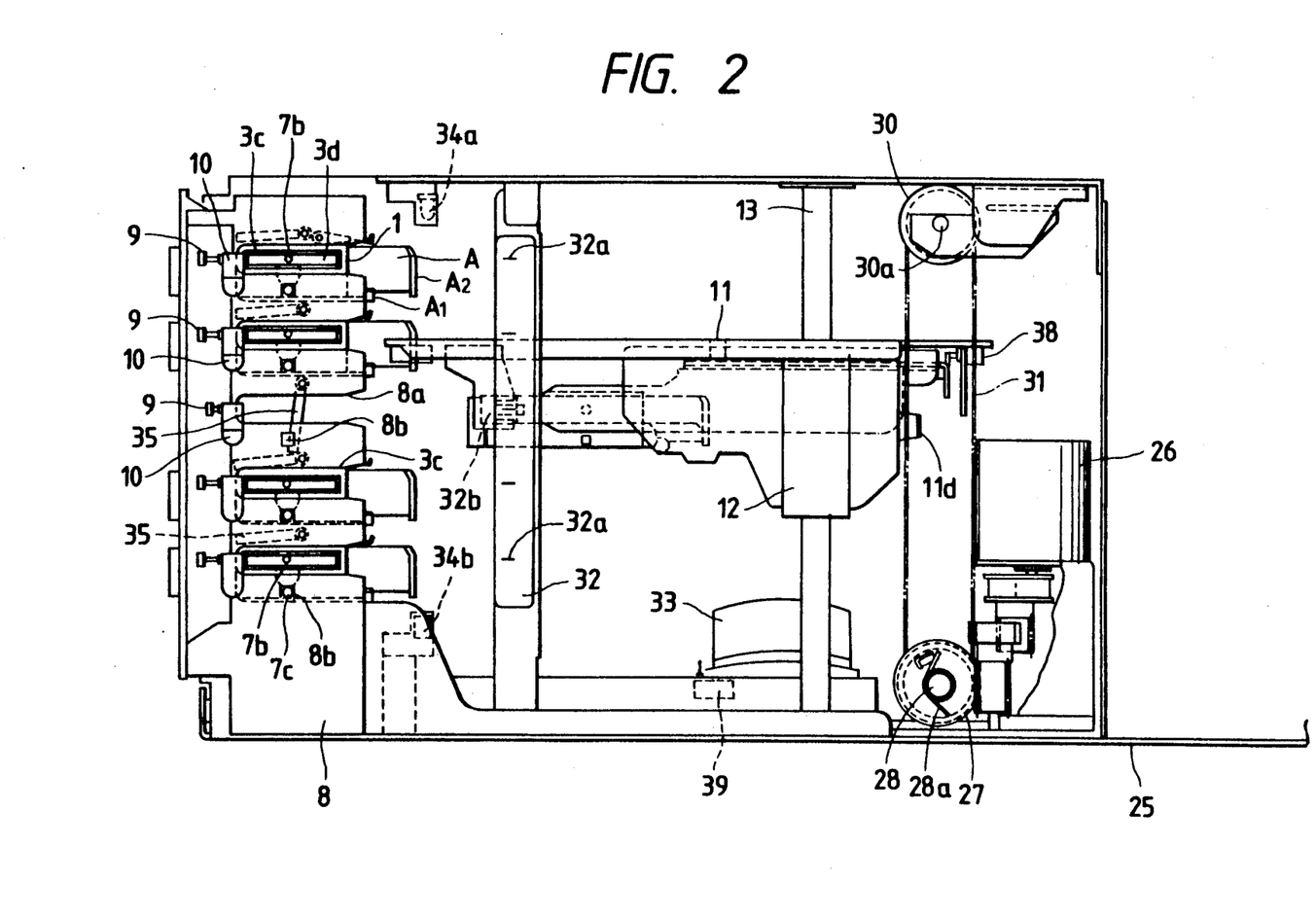
FIG. 2 is a side view of FIG. 1.
Figure 3:
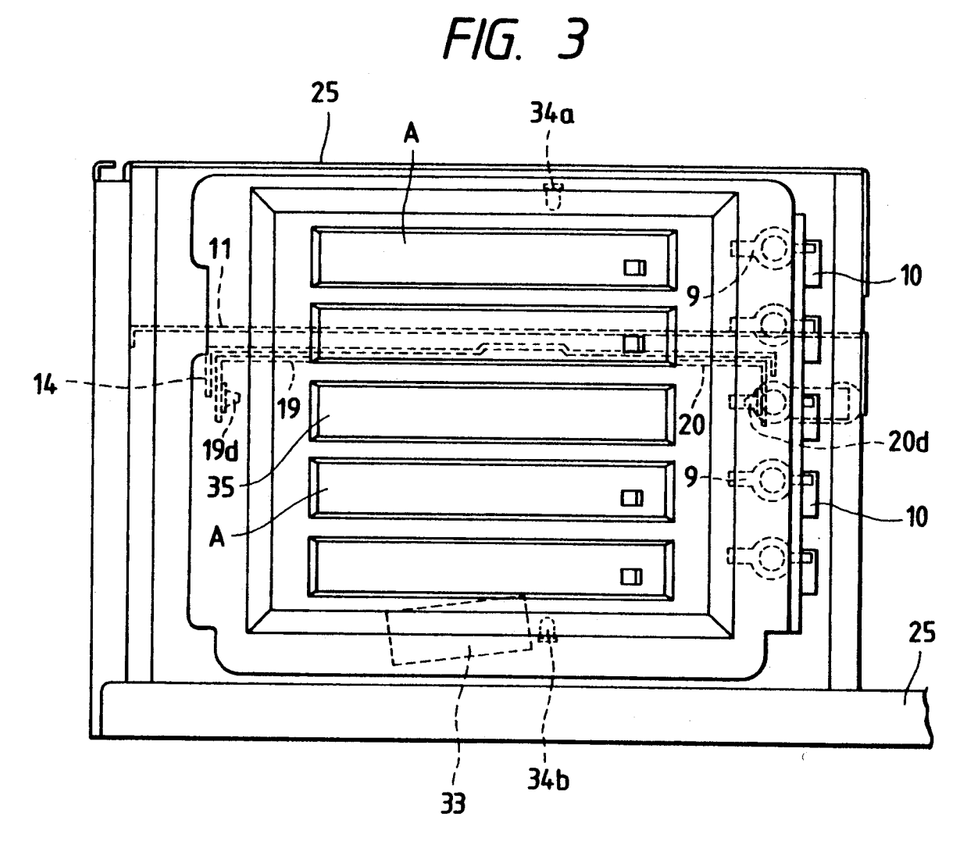
FIG. 3 is an elevation view of FIG. 1.
Figure 7:
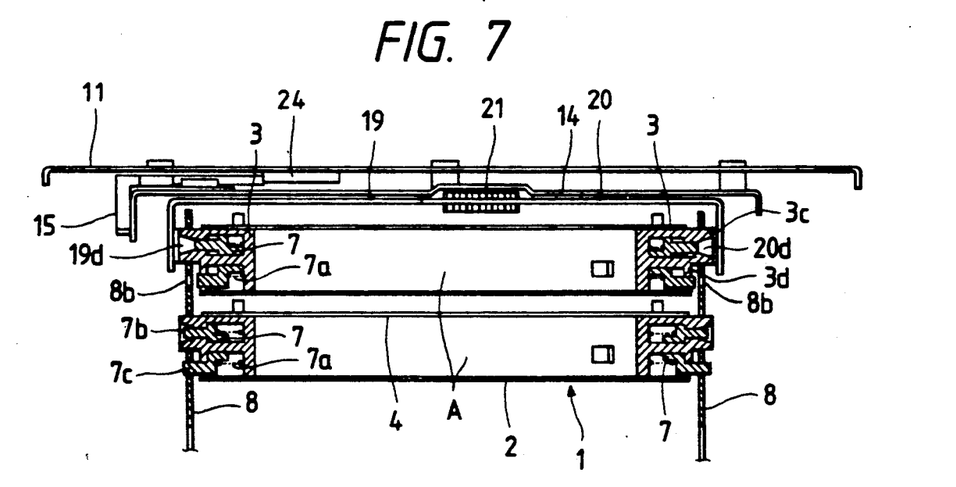
FIG. 7 is an elevation view when a compartment holds the carrier.

A compartment 8, which functions as a supporting means, is upright at the left and right sides as shown in FIGS. 2 and 7, in which a plurality of (for example, five) horizontally extending guide grooves 8a are disposed in vertically spaced relation.

Figure 10:
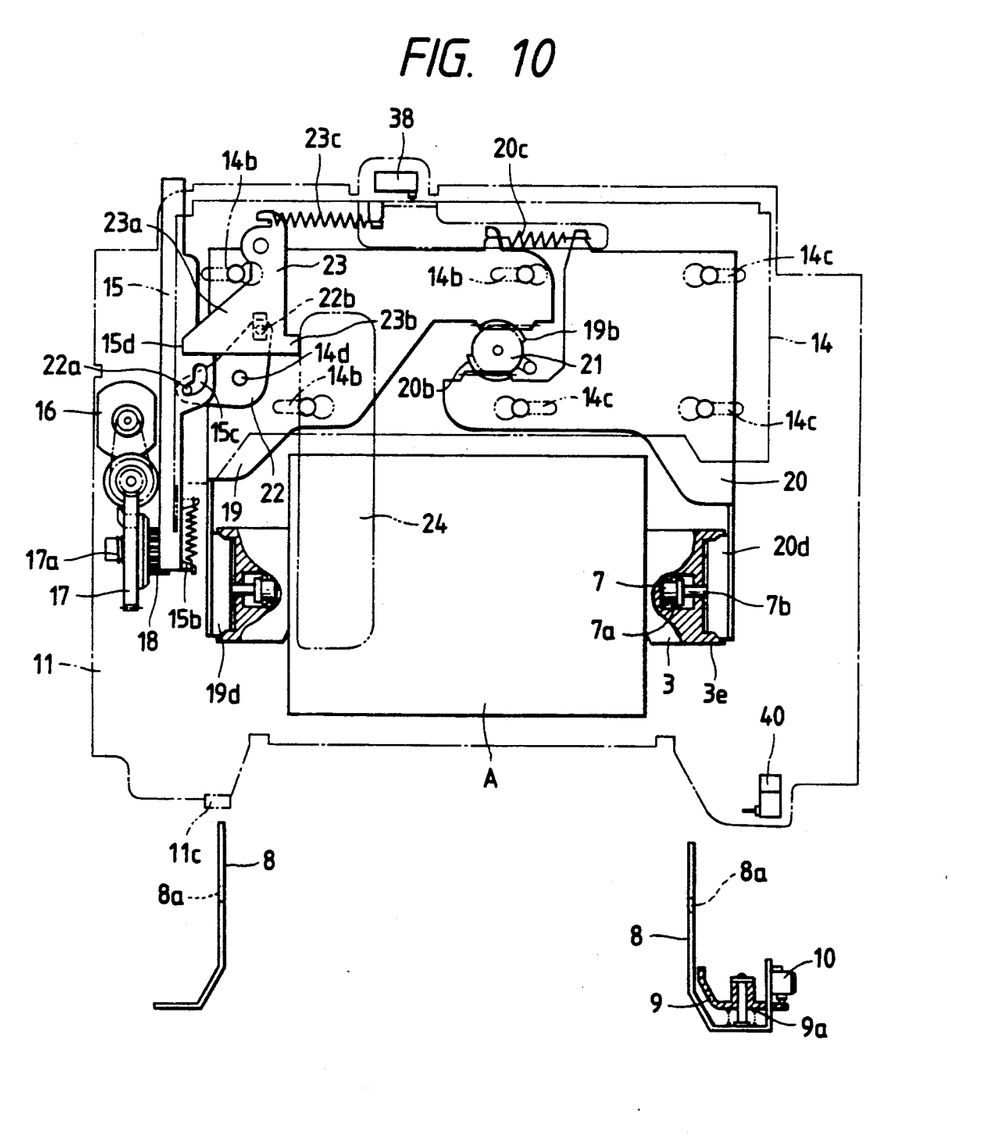
FIG. 10 is a top view of a sliding plate at its extreme stroke.

The lower pin 7c projecting from the lower step 3d is inserted into a hole 8b below the guiding groove 8a so as to fasten the carrier 1 to the compartment 8. As shown in FIG. 10, the compartment 8 is provided with a slider 9 and a switch 10 at the side portion thereof for each of the guiding grooves 8.

A spring 9a is mounted at the slider 9 to bias the slider 9 rearwardly. When the upper projection 3c is received in the guiding groove 8a and therefore the lower pin 7c is in engagement with the hole 8b, the slider 9 is pushed by the carrier 1 against the spring 9a so that the slider 9 is not pressed to the switch 10. However, when the lower pin 7c is caused to disengage from the hole 8b to allow the carrier 1 to backwardly slide along the guiding groove 8a, the slider 9 is pushed rearwardly by the spring 9a against the switch 10.

The pushed switch 10 indicates that the carrier 1 is extracted.

Figure 1:
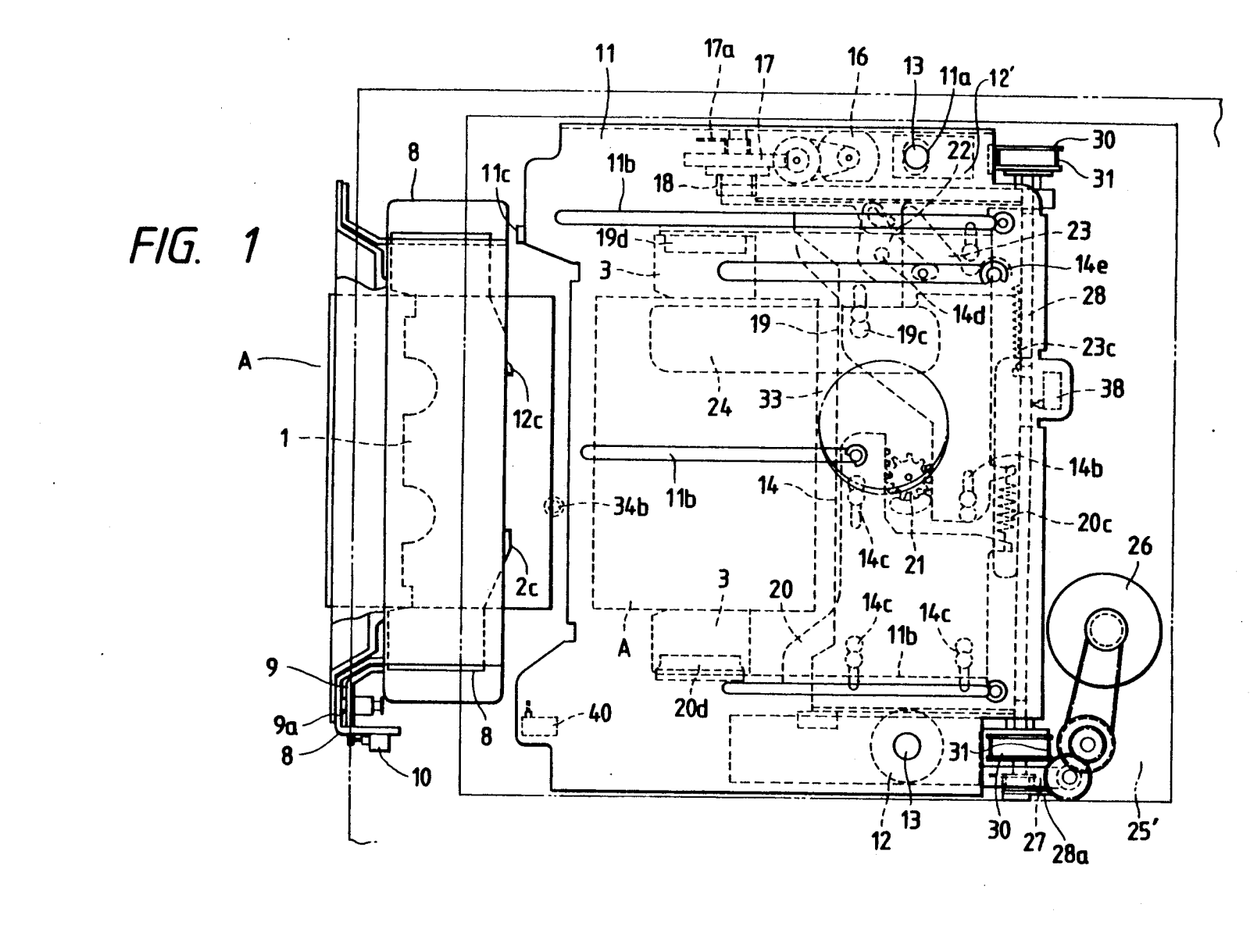
FIG. 1 is a general top view of an automatic cassette changer according to the present invention.
Figure 8:
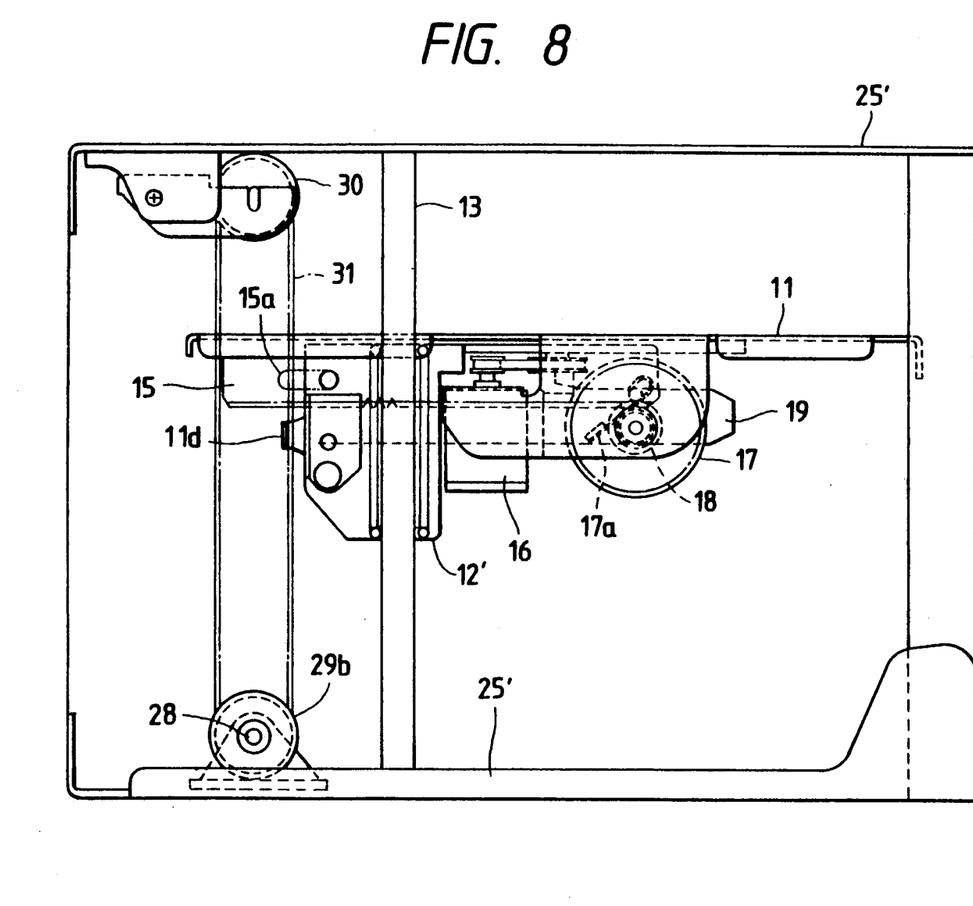
FIG. 8 is a side view when a main base is mounted.

Sliding hollow cylinders 12 and 12, are fixed on a main base 11 of an extracting means as shown in FIGS. 1, 2, and 8. The sliding hollow cylinders are slidably fitted onto the guide bars 13 such that the main base 11 may be moved vertically up and down.

Figure 9:
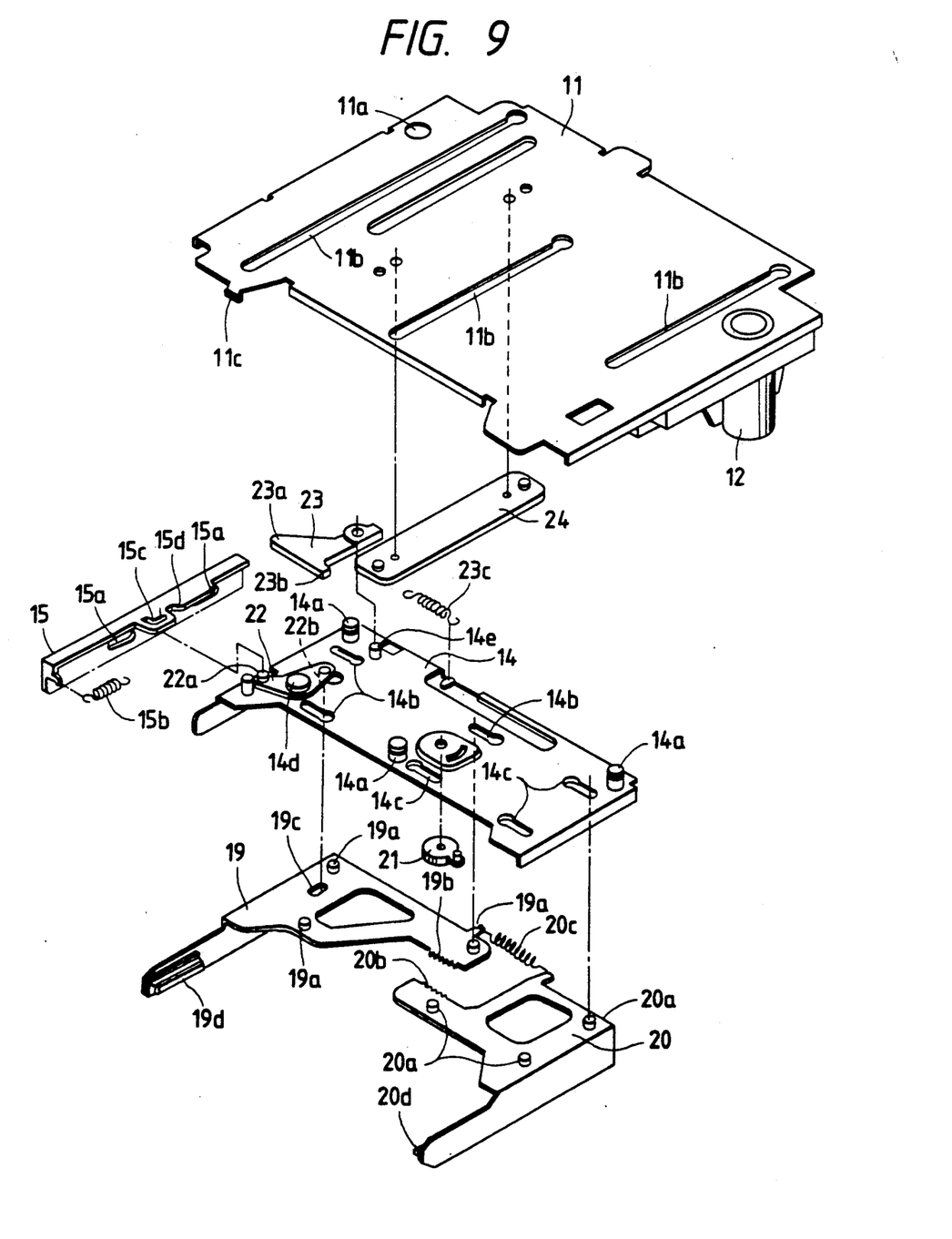
FIG. 9 is an exploded view of the main base.

The extracting means for extracting a selected one of the holding means will now be described in detail. As shown in FIG. 9, the main base 11 is formed with three guiding grooves 11b therein extending in the back and forth direction, and three pins 14a, 14a, and 14a of the slide plate 14 are inserted into the grooves such that the slide plate 14 is slidable in the back and forth direction relative to the main base 11.

The slide plate 14 slidably engages the rack 15 through a groove 15a, and a spring 15b is disposed between the slide plate 14 and the rack 15. As shown in FIG. 10, the main base 11 has a motor 16 mounted thereon which drives a reduction gear train of several stages. A torsion spring 17a is mounted between an output gear 17 of the reduction gear train and a gear 18 mounted coaxially with the output gear 17. The gear 18 is in meshing engagement with the rack 15.

The motor 16 drives the output gear 17 into rotation. The rotation of the gear 17 is transmitted to the gear 18 through the torsion spring 17a, the gear 18 driving the rack 15 to move forwardly.

The slide plate 14 is formed with three guiding grooves 14b and three guiding grooves 14c therein, each of which extends transverse to each of the guide grooves 11b. Into the guiding grooves 14b and 14c are slidably inserted pins 19a and 20a of two holder plates 19 and 20. Racks 19b and 20b of the holder plates 19 and 20 are in meshing engagement with a gear 21 which is journaled to the slide plate 14.

A spring 20c is disposed between the holder plates 19 and 20, so that when the pin 19a slides in the guiding groove 14b to displace the holder plate 19 in one direction, the motion of the holder plate 19 is transmitted via the gear 21 to the holder plate 20 such that the plate 20 is displaced in a direction opposite to that of the holder plate 19.

Thus, the holder plates 19 and 20 move closer to each other or further away from each other by relative movement. The slide plate 14 is provided with a boss 14d thereon in an upright position to which boss a pivotal plate 22 having pins 22a and 22b is pivotally fitted.

The pin 22a engages the rack 15 through a cam hole 15c, while the pin 22b is inserted into an elongated hole 19c in the holder plate 19.

When the rack 15 moves with respect to the slide plate 14 to guide the pivotal plate 22 through a cam hole 15c into pivoting motion, the holder plates 19 and 20 move closer to each other or further away from each other.

The slide plate 14 is provided with a boss 14e thereon in an upright position to which a lock lever 23 is rotatably journaled. A projection 23b of the lock lever 23 is adapted to slide along one side of the guide plate 24, which is secured to the main base 11, when another projection 23a of the lock lever 23 is fitted into a cam groove 15d.

Since the projection 23a of the lock lever 23 is fitted into the cam groove 15d of the rack 15, when the rack 15 moves, the slide plate 14 moves together with the rack 15. When the slide plate 14 has moved to cause the projection 23b of the lock lever 23 to disengage from the guide plate 24, the projection 23a of the lock lever 23 also disengages from the cam groove 15d of the rack 15, thus the movement of the slide plate 14 is stopped. Only the rack 15 further advances until a switch 40 is operated to stop the motor 16.

When the switch 40 is operated to stop the motor, the pin 22a of the pivotal plate 22 locates at a position above the cam hole 15c in the rack 15, thereby preventing damage to the cam hole 15c.

The lock lever 23 is urged by a spring 23c such that the projection 23a of the lever 23 tends to fit into the cam groove 15d. An elevating means will now be described, the elevating means including motor 26 which is mounted to a sub chassis 25'. The rotation of motor 26 is transmitted through a several-stage reduction gear to the output gear 27 (see FIG. 1).

The output gear 27 is loosely fitted on a shaft 28 on which two belt gears 29a and 29b are secured. Between the output gear 27 and one of the belt gears 29a is mounted a torsion spring 28a; the rotation of the output gear 27 is transmitted to the belt gears 29a and 29b through the torsion spring 28a to rotate the belt gears.

Belt gears 30 are mounted on a shaft 30a above the belt gears 29a and 29b, and a vertically extending cogged belt 31 is disposed about the belt gears 29a and 30 as well as about the belt gears 29b and 30. Each of the cogged belts 31 is secured at its intermediate position to a grip portion 11d of the main base 11 (see FIGS. 1 and 2).

Therefore, when the motor 26 runs, the belt gears 29a and 29b are driven into rotation to drive the cogged belts 31 which in turn carry the main base 11, fixed to the cogged belts, vertically upward or downward along the guiding bars 13.

The sub chassis 25' is provided with a vertically standing slit plate 32 which is formed with a slit 32a therein for each of guiding grooves 8a in the compartment 8, so that a sensor 32b provided on the main base 11 reads the slits 32a to control the rotation of motor 26.

The main chassis 25 is provided with a head drum 33 thereon around which the tape in the tape cassette A is wrapped and which rotates to record signals into or reproduce signals from the magnetic tape by means of a magnetic head mounted thereon. The main chassis 25 is also provided with tape driving mechanisms including a guide post (not shown) which draws the magnetic tape out of the tape cassette A and wraps the tape around the head drum 33, a capstan, a pinch roller, a reel bed, an opener of the lid $A_2$ of the tape cassette A and so on.

An LED 34a and a photo transistor 34b for receiving the light from the LED 34a are disposed in vertically spaced apart relation on the sub chassis 25', so that when the carrier 1 is drawn a certain distance out of the compartment 8 to block the light path, the tape cassette A is detected.

The operation of the apparatus will now be described.

The tape cassettes A are loaded into the respective carriers 1 with the slider $A_1$ positioned at the extreme end of its slide stroke and the lid $A_2$ unlocked.

At this time, a lid 35 which is pivotally mounted at its upper end to the upper portion of the respective guiding groove 8a of the compartment 8, is pushed up by the carrier 1.

Figure 11:
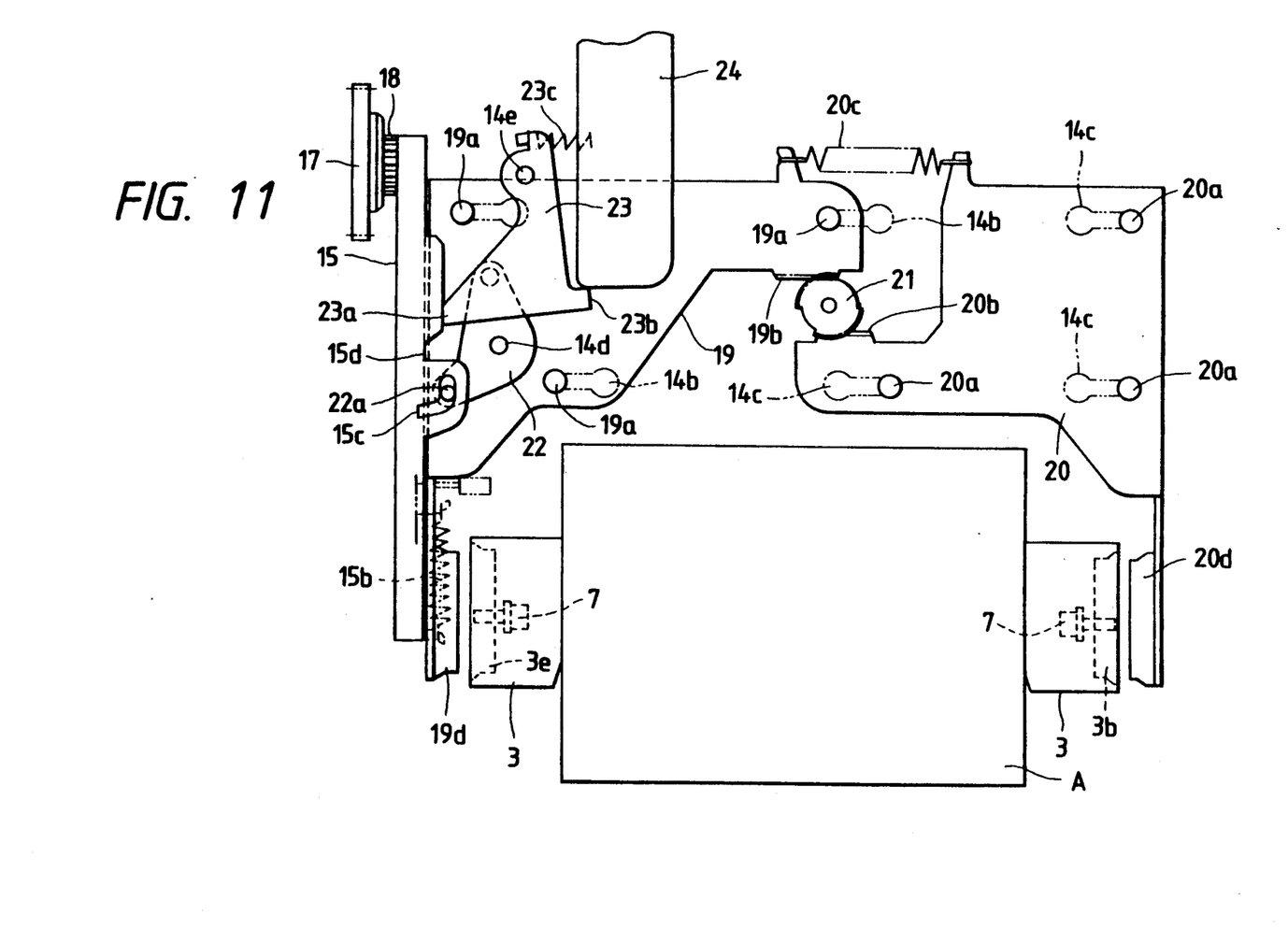
FIG. 11 is a top view when a holder is in a standby condition.
Figure 12:
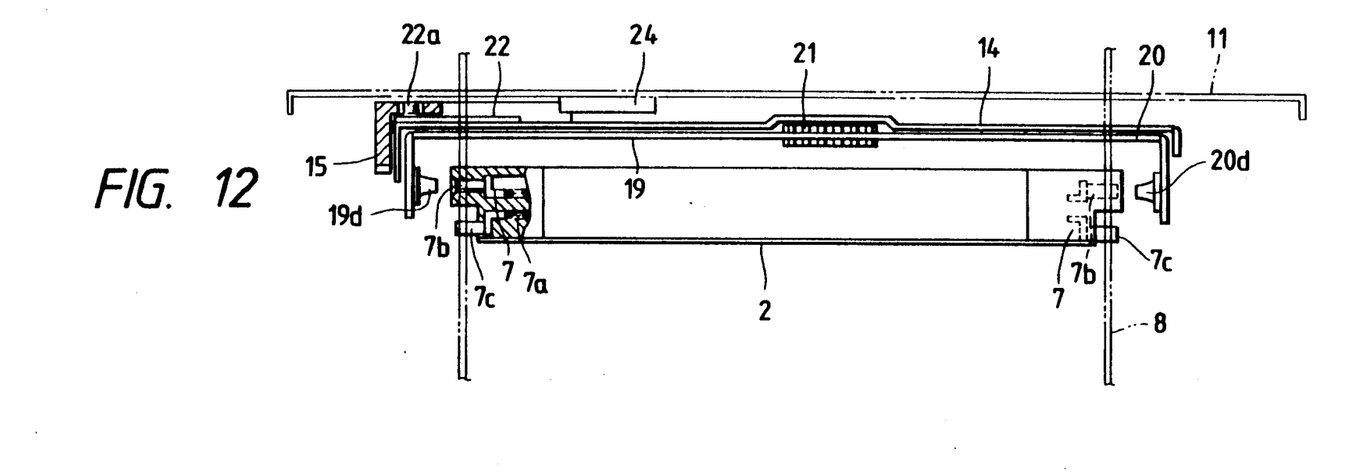
FIG. 12 is an elevation view of FIG. 11.
Figure 13:
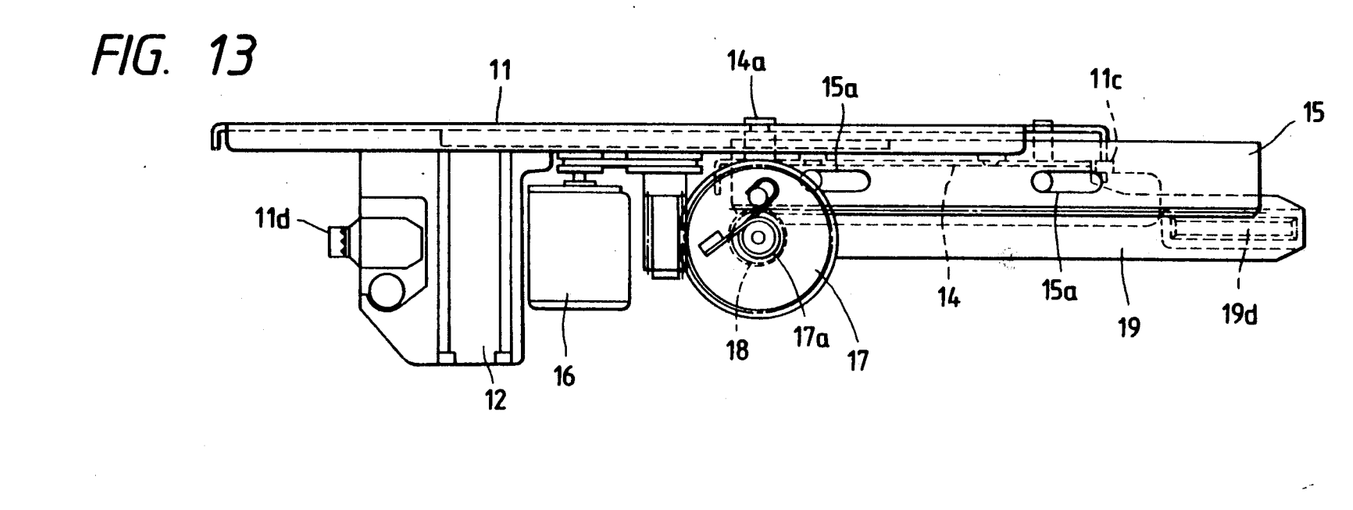
FIG. 13 is a side view of FIG. 11.

Then, the holder plates 19 and 20 are spaced apart as shown in FIGS. 11 and 12, holder portions 19d and 20d at their tips being out of engagement with the recess 3e of the carrier 1.

Under this condition, if an instruction is given to reproduce the third tape cassette A from the top, the sensor 32b reads the slit 32a to cause the motor 26 to run which in turn causes the main base 11 to move vertically upward or downward. The motor 26 stops when the holder portions 19d and 20d are as high as the recess 3e of the third carrier 1.

Following the stoppage of motor 26, the motor 16 begins to run so as to move the rack 15 upward as shown in FIG. 11. At this time, the slide plate 14 is not allowed to move together with the rack 15 because the projection 23b of the lock lever 23 is at rest at the end of guiding plate 24, the motion of the rack 15 being relative to that of the slide plate 14.

Thus, the pin 22a of pivotal plate 22 is guided by the cam hole 15c to pivot and the pin 22b causes the holder plates 19 and 20 to approach toward each other, thus the holder portions 19d and 20d go into the recesses 3e from both sides of the carrier 1.

The holder portions 19 and 20 then push the upper pins 7b projecting into the recesses 3e to cause the lower pins 7c to disengage from the hole 8b in the compartment 8. This releases the locked condition of the carrier 1. When the rack 15 moves relative to the slide plate 14 until the cam groove 15d reaches the projection 23a of the lock lever 23, the projection 23a goes into engagement with the cam groove 15d with the aid of the biasing force of the spring 23c, so that the rack 15 is interlocked with the slide plate 14.

The engagement of projection 23a with the cam groove 15d causes the lock lever 23 to pivot, which causes the projection 23b to move out of engagement with the guiding plate 24. This allows the slide plate 14 and rack 15 to move together.

As shown in FIGS. 13-16, during the movement of the slide plate 14 and rack 15, the projection 23b is in abutting relation with the guiding plate 24, blocking the pivotal motion of the lock lever 23 and the carrier 1 being held by the holder portions 19d and 20d.

In this manner, the movement of the slide plate 14 causes the carrier 1, which is held by the holder portions 19d and 20d, to be extracted at its upper projection 3c from the guiding groove 8a further into the tape player.

When the carrier 1 has been extracted, the lid 35, which has been pushed up, now descends into the guiding groove 8a to prevent inadvertent insertion of another tape cassette A.

When the carrier 1 has been extracted, the slider 9 is no longer pressed by the carrier 1. The slider 9 is urged by the spring 9a to depress the switch 10 into the ON position, which indicates the carrier 1 that is actually extracted.

A certain time interval after the switch 10 is turned on, the tape cassette A loaded into the carrier 1 and held by the holder plates 19 and 20 advances into the light path between the LED 34a and photo transistor 34b.

At this time, if the photo transistor 34b still receives the light from the LED 34a, it is determined that a tape cassette A is not loaded into that carrier 1.

Figures 18, 19:
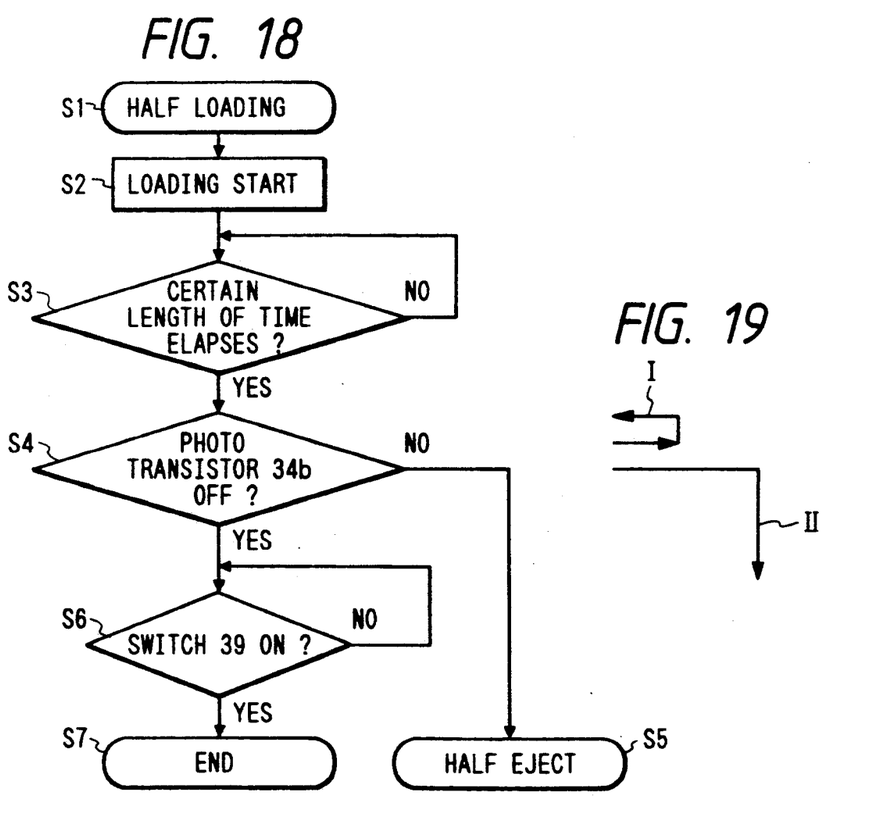
FIG. 18 is a flowchart of the circuit in FIG. 17.
FIG. 19 is an illustration of the operation in accordance with the flowchart of FIG. 18.

On receiving the light from the LED 34a, the photo transistor 34b transmits a signal to a control circuit 36, the operation of which is described by way of a flowchart in FIG. 18.

At step 1, the cassette A is in a half loading condition where, since the holder portions 19d and 20d hold the carrier 1, the holding plate 20 moves away from a later described switch 40 to shift the switch 40 into the OFF position.

At step 2, the switch 10 is turned ON and a certain length of time elapses (step 3). Upon the elapse of a predetermined length of time, a decision is made based on whether or not the photo transistor is still receiving the light from the LED 34a at step 4; if receiving, the program recognizes that the carrier 1 is not loaded with a tape cassette A thereinto, and the program proceeds to step 5. At step 5, a driving circuit 37 is activated to cause the motor 16 to run in a reversed direction so as to return the carrier 1 to the compartment 8.

Thus, as depicted by operation route I in FIG. 19, the time and distance required for the carrier 1 to return to its home position is greatly reduced as compared to operating route II for the conventional apparatus in which the return of carrier to its home position is recognized when the tape cassette A is set in the tape driving mechanism.

The carrier 1 is returned in the same manner as the carrier 1 is returned from tape driving mechanism to the compartment 8 which will be described later.

If the photo transistor 34b does not receive the light from the LED 34a at step 4, then the carrier 1 is regarded as being loaded with a tape cassette A thereinto; through the driving circuit 37 (see FIG. 17), the control circuit 36 causes the motor 16 to continue running, thus pressing the tape cassette A against the tape driving mechanism. When the switch 39 is turned ON at step 7, the cycle is completed.

When the carrier 1 reaches a predetermined position, the slide plate 14 depresses the switch 38, as shown in FIG. 10, to shift the switch 38 into the ON position.

When the switch 38 is turned ON, a driving circuit 41 (see FIG. 17) causes the motor 16 to stop. At this time, the overstroke of the motor 16 is absorbed by the torsion spring 17a whose spring force is used to urge and hold the slide plate 14 at a position shown in FIG. 10. The motor 26 operates to drive the cogged belts 31 so as to move the main base 11 vertically downward.

The downward movement of the main base 11 causes the tape cassette A in the carrier 1, which is held by the holders 19 and 20, to descend to the main chassis 25 where the lid opener opens the lid $A_2$ and the cassette tape A is loaded into the tape driving mechanism. When the carrier 1 descends to such a position, the sliding hollow cylinder 12 depresses the switch 39 in FIG. 2 to shift it to the ON position. After the switch 39 is turned ON, the motor 26 continues to run for a certain length of time and then stops. The extra rotation of the motor 26 urges the torsion spring 28a which in turn is transmitted to the main base 11 via the cogged belts 31, so that the tape cassette A is pressed against the tape driving mechanism. This completes the setting or loading of the tape cassette.

When commands for recording into and terminating the reproduction of the thus loaded tape cassette A, or commands for recording into and terminating the reproduction of the other tape cassettes A are issued, the motor 26 runs to lift the main base 11 to a height where the sensor 32b detects the slit 32a that corresponds to the guiding groove 8a of the compartment 8 whose switch 10 is in the ON position.

This height is at a level where the guiding groove 8a of interest is as high as the upper projection 3c of the carrier 1 that is held.

Upon the detection of the slit by sensor 32b, the motor 26 is stopped to fix the height of the main base 11, then the motor 16 operates to cause the rack 15 to move toward the compartment 8.

Since the slide plate 14 moves operatively together with the rack 15, the carrier 1 held by the holder portions 19d and 20d is returned at the upper projection 3c thereof into the guiding groove 8a.

Since the carrier 1 pushes the slider 9 against the spring 9a, the slider 9 moves away from the switch 10 to shift the switch 10 to the OFF position, thus indicating that the carrier 1 has been returned to the compartment 8.

Figure 14:
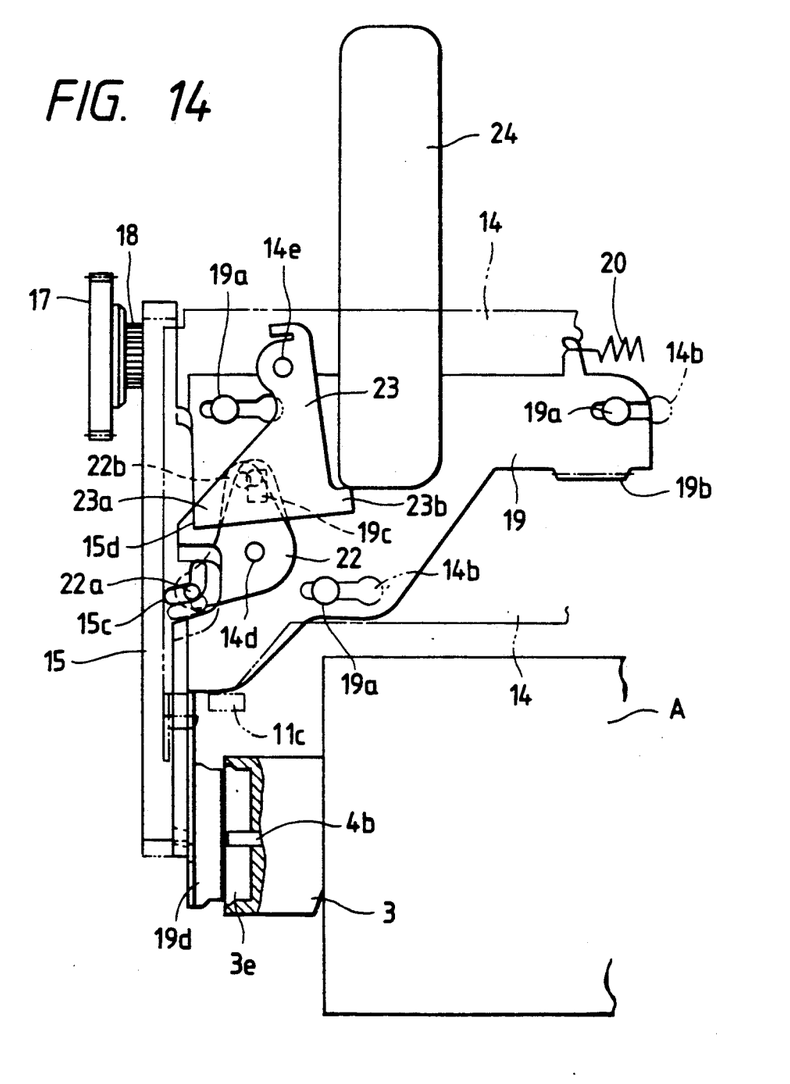
FIG. 14 is a top view of the older and carrier when the holder is in the course of holding or releasing the carrier.
Figure 15:
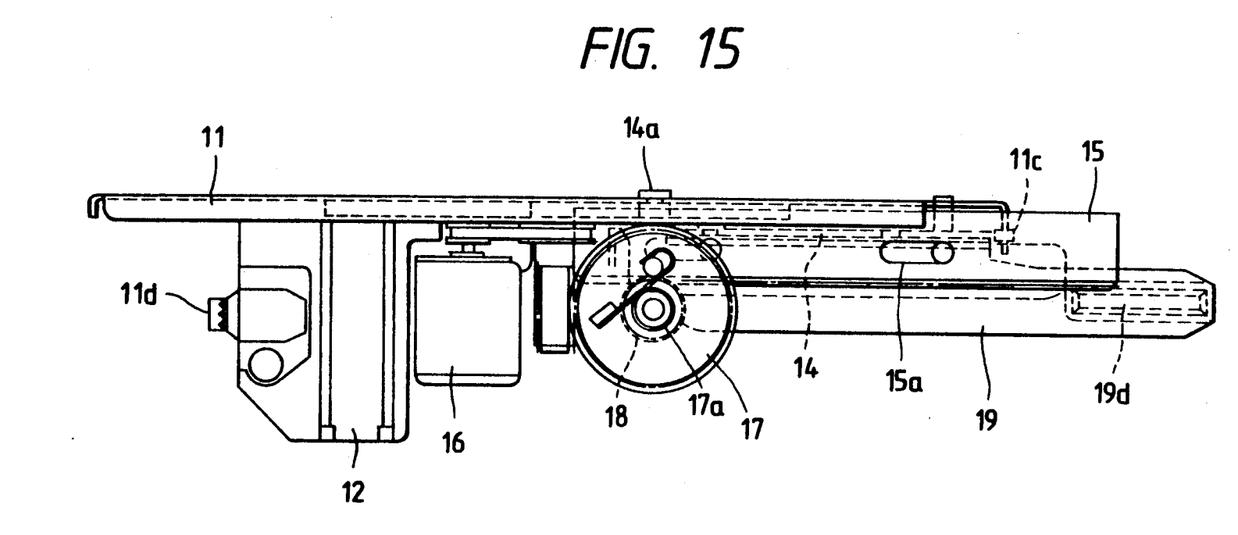
FIG. 15 is a side view of FIG. 14.
Figure 16:
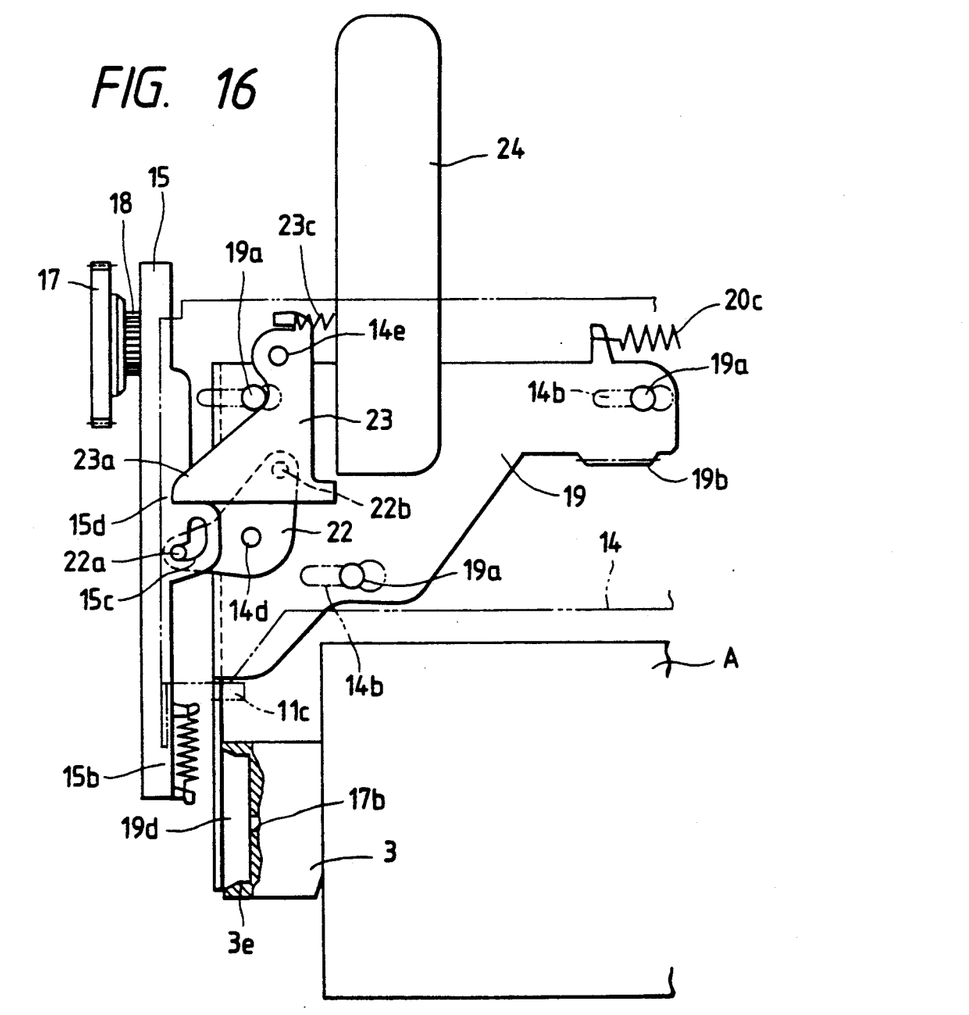
FIG. 16 is a top view of the holder when the holder is holding the carrier.
Figure 17:
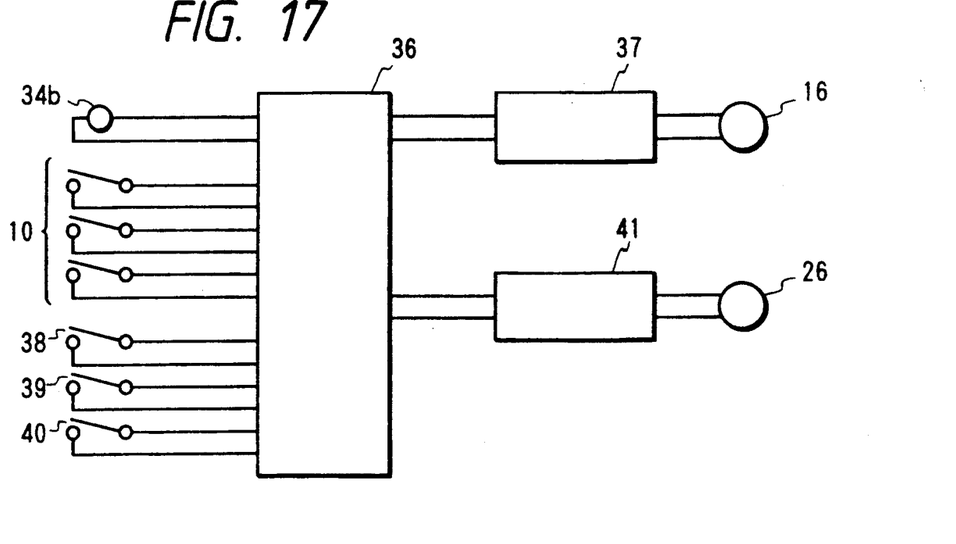
FIG. 17 is a schematic diagram of a control circuit.

Then, the slide plate 14 abuts the downwardly folded portion 11c of the main base 11 as shown in FIG. 14 such that the slide plate is not allowed to move any longer while at the same time the projection 23b of the lock lever 23 reaches the edge of guiding plate 24 to render the lock lever 23 rotatable.

Thus, the rack 15 causes the lock lever 23 to pivot such that the projection 23a of lock lever 23 disengages from the cam groove 15d while also guiding the pin 22a of the pivot plate 22 in the cam hole 15c so that the pivotal plate 22 pivots.

The pivotal motion of pivotal plate 22 causes, via the pin 22b the holder plates 19 and 20, to move in a direction away from each other, thus the holder portions 19d and 20d escape from the recesses 3e.

When the holder portions escape from the recesses 3e, the rear surface of the holder portion 20d pushes the switch 40 to shift it to the ON position which indicates that the carrier 1 has been returned.

Since the holder portions 19d and 20d release the carrier 1, they no longer press the upper pin 7b. In the mean time, the lower pin 7c of the lock pin 7 is urged by the spring 7a into the hole 8b, thereby the carrier 1 is locked to the compartment 8.

If another tape cassette A is to be loaded into the tape driving mechanism, the main base 11 is moved vertically up or down until the sensor 32b detects the slit 32a corresponding to the carrier 1 into which that tape cassette is loaded. Thereafter, the tape cassette A is set into the driving mechanism as described previously.

As described above, in the present invention, the tape cassette is loaded in a horizontal position into the holding means which is disposed in vertically stacked relation with some clearance therebetween by the supporting means; the desired holding means is selected by moving the extracting means up and down so as to extract the holding means from the supporting means; and the extracting means is moved vertically up and down by means of the elevation means so as to load the tape cassette into the tape driving mechanism.

Thus, the distance that the extracting means must travel when extracting the tape cassette is as short as possible such that cassette will not strike the other cassettes loaded into the other holding means when that cassette is extracted. Then, the tape cassette will be moved up or down to be loaded into the tape driving mechanism.

Thus, the depthwise dimension is greatly reduced in size as compared to the conventional apparatus. This permits mounting of the automatic cassette changer to the dashboard.

The holding means, extracting means, and elevating means are all assigned clear, specific roles which render the entire construction simple and require a smaller number of parts. This leads to reliable, trouble-free operation which in turn ensures higher reliability and lower manufacturing cost.

What is claimed is:

1. An automatic cassette changer for a tape player comprising:
    holding means for holding a tape cassette which is inserted thereinto in a horizontal position, said tape cassette being inserted into said holding means through an entrance of said holding means;
    supporting means for supporting a plurality of said holding means disposed in vertically stacked relation with a clearance therebetween;
    extracting means for extracting a selected one of said holding means from said supporting means rearwardly into the tape player; and
    elevating means for moving said extracting means to the selected one of said holding means which contains a desired said tape cassette therein and for loading the desired said tape cassette extracted by said extracting means from said holding means into a tape driving mechanism.

2. The automatic cassette changer according to claim 1, wherein each said holding means comprises a base, a pair of side frames, an upper plate and a retaining plate to generally form a rectangular box which is open at a front and rear thereof.

3. The automatic cassette changer according to claim 1, wherein said supporting means comprises a compartment in which a plurality of horizontally extending guide grooves are disposed in vertically spaced relation, each of said guide grooves supporting a corresponding one of said holding means.

4. The automatic cassette changer according to claim 1, wherein said extracting means includes a main base having sliding hollow cylinders fixed thereon, said sliding hollow cylinders being slidingly mounted onto guide bars for vertical movement up and down.

5. The automatic cassette changer according to claim 1, wherein said extracting means comprises a main base and a slide plate slidably mounted to said main base for movement back and forth relative to said main base and in a direction parallel to an insertion direction of said tape cassette through said entrance.

6. The automatic cassette changer according to claim 5, wherein said extracting means further comprises:
   a rack, said slide plate slidably engaging said rack;
   a motor, mounted on said main base, for driving said rack;
   a reduction gear train connected to said motor and having an output gear;
   a gear which is in meshing engagement with said rack; and
   a torsion spring which is mounted between said output gear of said reduction gear train and said gear which is in meshing engagement with said rack.

7. The automatic cassette changer according to claim 6, wherein said extracting means further comprises:
   a pair of holder plates slidably mounted to said slide plate and disposed for movement toward and away from each other and in a direction perpendicular to the movement of said slide plate, each of said holder plates having a holder portion for engaging a corresponding recess formed in the selected one of said holding means which contains the desired tape cassette.

* * * * *